United States Patent
Frisk et al.

(10) Patent No.: US 6,465,041 B1
(45) Date of Patent: Oct. 15, 2002

(54) METHOD OF MAKING GAS DIFFUSION LAYERS FOR ELECTROCHEMICAL CELLS

(75) Inventors: Joseph William Frisk, Oakdale, MN (US); Wayne Meredith Boand, Lino Lakes, MN (US); James Michael Larson, Saint Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 10/028,586

(22) Filed: Dec. 19, 2001

(51) Int. Cl.[7] .............................. B05D 1/28; H01M 4/88
(52) U.S. Cl. ...................... 427/228; 427/358; 427/359; 427/365
(58) Field of Search ................................ 427/228, 359, 427/365, 358

(56) References Cited

U.S. PATENT DOCUMENTS

| | | | | |
|---|---|---|---|---|
| 4,518,705 A | * | 5/1985 | Solomon et al. | 156/306.6 |
| 5,124,018 A | * | 6/1992 | Furuya et al. | 204/284 |
| 6,019,606 A | * | 2/2000 | Yamamoto et al. | 434/45 |
| 6,103,077 A | * | 8/2000 | DeMarinis et al. | 204/282 |
| 6,127,059 A | | 10/2000 | Kato | 429/40 |

FOREIGN PATENT DOCUMENTS

| | | | |
|---|---|---|---|
| JP | 60-262356 | * | 12/1985 |
| JP | 61-209259 | * | 5/1986 |
| JP | 02-018862 | * | 1/1990 |
| WO | WO 2000/29643 | * | 5/2000 |

* cited by examiner

*Primary Examiner*—Erma Cameron
(74) *Attorney, Agent, or Firm*—Philip Y. Dahl

(57) ABSTRACT

A method is provided for making a gas diffusion layer for an electrochemical cell comprising the steps of: a) combining carbon particles and one or more surfactants in a typically aqueous vehicle to make a preliminary composition, typically by high shear mixing; b) adding one or more highly fluorinated polymers to said preliminary composition by low shear mixing to make a coating composition; and c) applying the coating composition to an electrically conductive porous substrate, typically by a low shear coating method.

20 Claims, No Drawings

METHOD OF MAKING GAS DIFFUSION LAYERS FOR ELECTROCHEMICAL CELLS

This invention was made with Government support under Cooperative Agreement DE-FC02-99EE50582 awarded by DOE. The Government has certain rights in this invention.

FIELD OF THE INVENTION

This invention relates to a three-step method of making a gas diffusion layer for an electrochemical cell by combining carbon particles and surfactant in a typically aqueous vehicle, typically by high shear mixing, adding fluoropolymer by low shear mixing, and applying the coating composition to an electrically conductive porous substrate, typically by a low shear coating method.

BACKGROUND OF THE INVENTION

U.S. Pat. No. 6,127,059 describes a method of coating a gas diffusion layer for use in an electrochemical cell with a composition made by simultaneously mixing fluororesin and carbon black in water.

SUMMARY OF THE INVENTION

Briefly, the present invention provides a method of making a gas diffusion layer for an electrochemical cell comprising the steps of: a) combining a vehicle with carbon particles and one or more surfactants to make a preliminary composition, typically by high shear mixing; b) adding one or more highly fluorinated polymers to said preliminary composition by low shear mixing to make a coating composition; and c) applying the coating composition to an electrically conductive porous substrate, typically by a low shear coating method.

What has not been described in the art, and is provided by the present invention, is a three-step method of mixing and coating a carbon/fluororesin composition which provides the high shear treatment of the carbon particles but avoids high shear treatment of the fluororesin.

In this application:

"vehicle" means a fluid which carries the particulate in a dispersion, which typically includes water or an alcohol;

"highly fluorinated" means containing fluorine in an amount of 40 wt % or more, but typically 50 wt % or more, and more typically 60 wt % or more;

"high shear mixing" means a mixing process wherein the fluid to be mixed encounters zones of shear having a shear rate greater than 200 $sec^{-1}$, and more typically greater than 1,000 $sec^{-1}$, typified by mixing with a high speed disk disperser or Cowles blade at sufficient rpms;

"ultra high shear mixing" means a mixing process wherein the fluid to be mixed encounters zones of shear having a shear rate greater than 10,000 $sec^{-1}$, and more typically greater than 20,000 $sec^{-1}$, typified by bead milling or sand milling at sufficient rpms;

"low shear mixing" means a mixing process wherein the fluid to be mixed does not substantially encounter zones of shear having a shear rate greater than 200 $sec^{-1}$, more typically not greater than 100 $sec^{-1}$, more typically not greater than 50 $sec^{-1}$, and more typically not greater than 10 $sec^{-1}$, typified by paddle mixing, hand stirring, or low-rpm mixing with a high speed disk disperser;

"low shear coating" means a coating process wherein the fluid to be coated does not substantially encounter zones of shear having a shear rate greater than 2000 $sec^{-1}$, more typically not greater than 1000 $sec^{-1}$, more typically not greater than 500 $sec^{-1}$, and more typically not greater than 100 $sec^{-1}$, typified by three-roll coating;

"carbon bleed-through" refers to the presence of carbon particles on an uncoated side of an electrically conductive porous substrate which have migrated through the substrate from a coated side, typically in an amount sufficient to be visible to the naked eye or more; and "substituted" means, for a chemical species, substituted by conventional substituents which do not interfere with the desired product or process, e.g., substituents can be alkyl, alkoxy, aryl, phenyl, halo (F, Cl, Br, I), cyano, nitro, etc.

It is an advantage of the present invention to provide a method of making a coating composition for coating a gas diffusion layer for use in an electrochemical cell which provides both highly dispersed carbon and highly dispersed fluororesin.

DETAILED DESCRIPTION OF PREFERRED EMBODIMENTS

The present invention provides a method of making a gas diffusion layer for an electrochemical cell comprising the steps of: a) combining a vehicle with carbon particles and one or more surfactants to make a preliminary composition, typically by high shear mixing; b) adding one or more highly fluorinated polymers to said preliminary composition by low shear mixing to make a coating composition; and c) applying the coating composition to an electrically conductive porous substrate, typically by a low shear coating method.

Fuel cells are electrochemical cells which produce usable electricity by the catalyzed combination of a fuel such as hydrogen and an oxidant such as oxygen. Typical fuel cells contain layers known as gas diffusion layers or diffuser/current collector layers adjacent to catalytically reactive sites. These layers must be electrically conductive yet must be able to allow the passage of reactant and product fluids. Typical gas diffusion layers are coated with a layer of carbon particles and fluoropolymers on the surface adjacent to the catalyst. This invention concerns improvements in coating the carbon/fluoropolymer layer. Specifically, the method according to the present invention provides for high shear treatment of the carbon particles, resulting in increased wetting-out and dispersion, but avoids high shear treatment of the fluororesin which can cause agglomeration.

The coating composition may employ any suitable aqueous vehicle. The vehicle comprises water and may additionally comprise alcohols, and more typically comprises only water or alcohols. Most typically the vehicle comprises water alone.

The coating composition may comprise any suitable surfactant or dispersant, including amine oxide surfactants described in co-pending patent application Ser. No. 10/028,173, filed on even date herewith and incorporated herein by reference. Suitable amine oxides may belong to formula II: $R_3N \rightarrow O$, where each R is independently selected from alkyl groups containing 1–20 carbons, which optionally include ether and alcohol groups, and which may be additionally substituted. Typical amine oxide surfactants according to the cited disclosure are alkyl dimethylamine oxides according to formula (I):

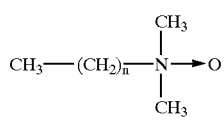

$$(I)$$

wherein n is 9 to 19 or more typically 11 to 15. Most typically, n is 11 or 13. The amine oxide according to formula (I) is optionally substituted. Suitable amine oxide surfactants may include those available under the trade names Genaminox®, Admox®, Ammonyx®, and Ninox®.

Other suitable surfactants may include alcohol alkoxylates such as Triton™ X100.

The coating composition typically comprises 0.1–15% surfactant by weight, more typically 0.1–10% by weight, and most typically 1–5% by weight.

Any suitable carbon particles may be used. It will be understood that the term "carbon particles" as used herein can refer to primary particles, typically having a average size of 1–100 nm, primary aggregates of primary particles, typically having an average size of 0.01–1 microns, secondary aggregates of primary aggregates, typically having an average size of 0.1–10 microns, and agglomerates of aggregates, typically having an average size of greater than 10 micron. Most typically, the term "carbon particles" refers to primary particles or primary aggregates. Typically a carbon black is used, such as Vulcan XC-72 (Cabot Corp., Special Blacks Division, Billerica, Mass.), Shawinigan Black, grade C55, (Chevron Phillips Chemical Company, LP, Acetylene Black Unit, Baytown, Tex.) or Ketjenblack EC300J (Akzo Nobel Chemicals Inc., Chicago, Ill.). The aqueous coating composition typically comprises 1–50% carbon particles by weight, more typically 1–20% by weight, and most typically 5–15% by weight. Typically, the aqueous coating composition comprises lower weight percent content of carbon particles where smaller particles are used.

The carbon particles are typically suspended in the vehicle by high shear mixing to form a preliminary composition. High shear mixing advantageously provides improved wetting-out of carbon particles with the vehicle as well as improved dispersion and de-agglomeration. In addition, the preliminary composition may be degassed or defoamed by any suitable method, including standing. The preliminary composition may be further mixed by ultra high shear mixing, typically after degassing or defoaming.

A thickening agent may be added to the preliminary composition. Any suitable thickening agent may be used, including polyacrylates such as Carbopol® EZ-2 (B.F. Goodrich Specialty Chemicals, Cleveland, Ohio).

A defoaming agent may be added to the preliminary composition. Any suitable defoaming agent may be used, such as Mazu® DF 210 SX (BASF Corp., Mount Olive, N.J.).

Without wishing to be bound by theory, it is believed that the advantage of the method according tot he present invention derives from the fact that high shear mixing or ultra high shear mixing, which provides de-agglomeration of particulate carbon, can cause agglomeration of fluoropolymer in dispersion. The present method provides two-step mixing and low shear treatment of fluororesin-containing compositions and thus prevents or reverses agglomeration of both carbon and fluoropolymer particles.

Any suitable highly fluorinated polymers may be used. The highly fluorinated polymer is typically a perfluorinated polymer, such as polytetrafluoroethylene (PTFE), fluorinated ethylene propylene (FEP), perfluoroalkyl acrylates, hexafluoropropylene copolymers, tetrafluoroethylene/hexafluoropropylene/vinylidene fluoride terpolymers, and the like. The aqueous coating composition typically comprises 0.1–15% highly fluorinated polymers by weight, more typically 0.1–10% by weight, and most typically 1–5% by weight. The highly fluorinated polymer is typically provided as an aqueous or alcoholic dispersion, most typically aqueous, but may also be provided as a powder.

Any suitable low shear method can be used to mix the fluororesin and the preliminary composition to form the coating composition, including paddle mixing and the like. Typically the low shear mixing process exposes the coating compositions to shear rates of no greater than 100 $\sec^{-1}$, more typically not greater than 50 $\sec^{-1}$, and more typically not greater than 10 $\sec^{-1}$.

The coating composition can be coated onto any suitable electrically conductive porous substrate. Typically, the electrically conductive porous substrate is a carbon fiber construction. Typically carbon fiber constructions are selected from woven and non-woven carbon fiber constructions. Carbon fiber constructions which may be useful in the practice of the present invention may include: Toray® Carbon Paper, SpectraCarb™ Carbon Paper, AFN® non-woven carbon cloth, Zoltek Panex® Carbon Cloth, and the like. The porous substrate may be treated prior to coating. Typical treatments include those that increase or impart hydrophobic properties, such as treatment with fluoropolymers such as PTFE. Other typical treatments may increase or impart hydrophilic properties.

Any suitable method of coating may be used, however typically a low shear coating method is used. Typically the low shear mixing process exposes the coating compositions to shear rates of no greater than 100 $\sec^{-1}$, more typically not greater than 50 $\sec^{-1}$, and more typically not greater than 10 $\sec^{-1}$. Typical methods include both hand and machine methods, including hand brushing, notch bar coating, fluid bearing die coating, wire-wound rod coating, fluid bearing coating, slot-fed knife coating, and three-roll coating. Most typically three-roll coating is used. Advantageously, coating is accomplished without carbon bleed-through from the coated side of the substrate to the uncoated side. Coating may be achieved in one pass or in multiple passes. Coating in multiple passes may be useful to increase coating weight without corresponding increases in mud cracking.

The coated substrate may then be heated to a temperature sufficient to remove the vehicle and surfactants. The coated substrate may be heated to a temperature sufficient to sinter the highly fluorinated polymers.

The resulting gas diffusion layer is typically incorporated into a membrane electrode assembly for use in an electrochemical cell such as a hydrogen fuel cell by any suitable method, many of which are known in the art.

This invention is useful in the manufacture of a gas diffusion layer for use in electrochemical cells such as hydrogen fuel cells.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or are available from Aldrich Chemical Co., Milwaukee, Wis., or may be synthesized by known methods.

Example 1

19.20 kg of carbon black Vulcan XC-72 (Cabot Corp., Special Blacks Division, Billerica, Mass.), was added rapidly to 123.6 kg of deionized water in a plastic-lined 208 L drum while mixing with a 22.9 cm diameter high-speed disk disperser (HSDD). The HSDD rpm was increased gradually as the apparent viscosity increased. When the mixture reached the point that the HSDD was no longer able to move the mixture and/or when ridges were noted on the surface, surfactant Genaminox CST (Clariant Corporation, Functional Chemicals, Mt. Holly, N.C.) (30% surfactant by weight in water) was added in 1 L increments until the mixture could be moved by the HSDD again, and then the remainder of a total of 16.9 kg additional Genaminox CST was added incrementally. After standing overnight to allow foam to collapse, a 15.2 cm diameter, 3 blade propeller mixer at low rpm, only high enough to just move the mixture) was used to re-suspend any carbon that had settled and then, for ultra high shear mixing, the mixture was pumped through a 13 L horizontal media mill having a 50 vol. % charge of 0.8–1.9 mm type SEPR ceramic media at 0.95 L/minute and a shaft rotation of 1200 rpm. The discharged dispersion did not contain any significant amount of foam. It was stored in 19 L plastic containers.

Particle size analysis of the resulting preliminary composition was done using a Horiba LA-910 particle size analyzer (Horiba Instruments Inc., Irvine, Calif.). On a number basis, the mean particle size was 0.354 micron, 10% were larger than 0.548 micron, and 90% were larger than 0.183 micron. Only 0.20% was larger than 1.000 micron.

This dispersion was stable as indicated by no increase in particle size for at least 10 months. Simple stirring with a spatula was sufficient to restore to the original homogeneous state.

A coating composition was prepared by adding 813.5 g of Dyneon TF 5235 PTFE Dispersion (60% PTFE by weight) (Dyneon LLC, Aston, Pa.) to 16.229 kg of the above dispersion to provide an 80/20 w/w ratio of carbon to PTFE. Simple low shear hand mixing with a spatula was sufficient for mixing.

This dispersion was then coated onto wet-proofed Avcarb 1071 HCB cloth by a three roll coating method using a Hirano Tecseed M200LC coater without bleed-through. This three-roll coating method is commonly referred to as a three roll nip-fed reverse roll coater. (See, Coyle, D. J., Chapter 12 "Knife and roll coating" in *Liquid Film Coating*, ed. Stephan F. Kistler and Peter M. Schweizer, Chapman & Hall, The University Press, Cambridge, 1997, incorporated herein by reference.)

Example 2

13.2 g of Carbopol EZ-2 (B.F. Goodrich) were sifted into 13.000 kg of the preliminary composition of Example 1 while mixing at 1000 rpm with a 8.9 cm diameter high-speed disk disperser (HSDD). (Model HAS40A 4 hp air mixer with 11.4 cm (4.5") diameter Cowles Blade, INDCO Inc.)

A coating composition was prepared by adding 9.25 g of ammonium hydroxide to 601.5 g of Dyneon 5235 PTFE and adding this mixture to the Carbopol EZ-2 containing carbon dispersion while continuing to mix until the mixer could no longer move the mixture at 1000 rpm to thicken the dispersion. Note that the amount of ammonium hydroxide used was sufficient to completely neutralized the EZ-2 acidic functional groups. Then 0.20 g of Mazu® DF 210 SX (BASF Corp., Mount Olive, N.J.) was added to facilitate defoaming.

This dispersion was then coated onto wet-proofed Avcarb 1071 HCB cloth by a three roll coating method using a Hirano Tecseed M200LC coater without bleed-through.

Example 3

To 5482 g of deionized water in a 7.6 L stainless steel metal beaker (23 cm diameter) were added 389 g of Shawinigan Black, grade C55 (Chevron Phillips Chemical Company, LP, Acetylene Black Unit, Baytown, Tex.) and 687 g of Genaminox CST through use of alternating additions of increments of the total amounts of carbon black and surfactant while mixing with a 7.6 cm diameter high-speed disk disperser (HSDD) blade (Model AS5AM 0.5 hp air mixer, equipped with a 7.6 cm (3") diameter Design A Cowles Blade, INDCO Inc.), together with an air driven rotor-stator (RS) mixer having a rotor with a diameter of approximately 2.5 cm (1"). The initial HSDD rpm was about 1000 and the RS mixer was used at the lower end of its speed range during additions. The HSDD rpm was increased gradually during additions to about 1800 rpm. After additions were completed, the rpm for the RS mixer was increased to close to the maximum and mixing with both mixers was continued for 2 hours at these high shear conditions. Over this time, the HSDD rpm were decreased to about 1600 rpm as the apparent viscosity decreased. Upon standing overnight, most of the foam broke and remaining coarse foam broke quickly when stirred with a spatula.

Analysis of the particle size of the resultant dispersion on a particle number basis gave a mean particle diameter of 0.317 micron, 10% greater than 0.555 micron, 90% greater than 0.138 micron, and only 1.4% greater than 1.000 micron.

An additional batch of the above dispersion was prepared by the same method. The combined mass of the two batches was 11,449 g. Then 305.3 g of Dyneon 5235 PTFE dispersion was added by mixing by hand with a spatula having a 45 cm wide blade. This dispersion was then coated onto wet-proofed Avcarb 1071 HCB cloth by a three roll coating method using a Hirano Tecseed M200LC coater without bleed-through.

Example 4

A series of dispersions containing 0.090 wt. % Carbopol EZ-2 were prepared from a stock dispersion prepared as follows. To 4700 g of deionized water was added 686 g of Genaminox CST in a 7.6 L stainless steel beaker. Starting with a 7.6 cm diameter high-speed disk disperser (HSDD) (Model AS5AM 0.5 hp air mixer, equipped with a 7.6 cm (3") diameter Design A Cowles Blade, INDCO Inc.) at 1000 rpm, and air driven rotor-stator (RS) mixer having a rotor with a diameter of approximately 2.5 cm (1") at low rpm, 389 g of C55 Acetylene Black (Chevron) were added rapidly. The HSDD rpm was gradually increased to about 1800 rpm over the course of addition of the carbon black. After all the carbon was added, the RS rpm was increased to the middle of its rpm range. After 20 minutes, the HSDD rpm was decreased to 1500 rpm due to a decrease in apparent viscosity and the RS rpm was increased to maximum. Mixing was continued for 2 hours at these high shear conditions. Upon standing overnight, most of the foam broke and remaining coarse foam broke quickly when stirred with a spatula.

A dispersion that contained 0.09 wt. % Carbopol EZ-2 neutralized to 30%, was prepared using the following procedure. A slurry of 1.00 g of EZ-2 and 75 of deionized water was mixed into 1115 g of the above C55 dispersion using a 5.08 cm diameter HSDD at 500 rpm. Then a mixture of 0.21 g of ammonium hydroxide and 29.7 g of TFE 30 grade PTFE fluoropolymer resin (E.I. DuPont de Nemours & Company, Wilmington, Del.) was added quickly and mixing continued using the HSSD at 500 rpm until the mixture thickened, which happened very quickly. Other dispersions were prepared in corresponding fashion at other levels of neutralization.

Example 5

This dispersion was prepared using the same mixers as Example 4. To 5000 g of deionized water in a 7.6 L stainless steel metal beaker (23 cm diameter) were added 352 g of Ketjenblack EC300J (Akzo Nobel Chemicals Inc., Chicago, Ill.). All the EC300J was added to the water starting with the HSDD at 100 rpm and the RS at low rpm. Then 1049 g of Genaminox CST was added incrementally with sufficient time between additions for the apparent viscosity to increase to a point close to where the HSDD could no longer move the mixture. The initial HSDD rpm was about 1000 and the air driven RS mixer was used at the lower end of its speed range during additions. The HSDD rpm was gradually increased to 1500 rpm during addition of the EC300J. After additions were completed, the HSDD rpm was increased to about 1700 and the rpm for the RS mixer was increased to close to the maximum. Mixing with both mixers was continued for 2 hours at these high shear conditions. Upon standing overnight, most of the foam broke and remaining coarse foam broke quickly when stirred with a spatula.

Analysis of the particle size of the resultant dispersion on a particle number basis gave a mean particle diameter of 0.317 micron, 10% greater than 0.555 micron, 90% greater than 0.138 micron, and only 1.4% greater than 1.000 micron, and 1.9% greater than 1.000 micron.

An additional batch of the above dispersion was prepared by the same method. The combined mass of the two batches was 10,759 g. Then 269.5 g of Dyneon 5235 PTFE dispersion was added by mixing by hand with a spatula having a 45 cm wide blade. This dispersion was then coated onto wet-proofed Avcarb 1071 HCB cloth by a three roll coating method using a Hirano Tecseed M200LC coater without bleed-through.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A method of making a gas diffusion layer for an electrochemical cell comprising the steps of:
   a) combining a vehicle, carbon particles and one or more surfactants to make a preliminary composition;
   b) adding one or more highly fluorinated polymers to said preliminary composition by low shear mixing to make a coating composition; and
   c) applying said coating composition to an electrically conductive porous substrate.

2. The method according to claim 1 wherein said step of adding one or more highly fluorinated polymers to said preliminary composition is accomplished by low shear mixing wherein the preliminary composition does not substantially encounter zones of shear having a shear rate greater than 50 sec$^{-1}$.

3. The method according to claim 1 wherein said step of adding one or more highly fluorinated polymers to said preliminary composition is accomplished by low shear mixing wherein the preliminary composition does not substantially encounter zones of shear having a shear rate greater than 10 sec$^{-1}$.

4. The method according to claim 1 wherein said step of combining a vehicle, carbon particles and one or more surfactants is accomplished by high shear mixing.

5. The method according to claim 1 wherein said step of applying said coating composition to an electrically conductive porous substrate is accomplished by low shear coating.

6. The method according to claim 2 wherein said step of applying said coating composition to an electrically conductive porous substrate is accomplished by low shear coating wherein the coating composition does not substantially encounter zones of shear having a shear rate greater than 50 sec$^{-1}$.

7. The method according to claim 1 wherein the step of applying said coating composition is accomplished by use of a coating method selected from the group consisting of: three-roll coating, wire wound rod coating, notch bar coating, and fluid bearing die coating.

8. The method according to claim 7 wherein the step of applying said coating composition is accomplished by a three-roll coating method.

9. The method according to claim 5 wherein the step of applying said coating composition is accomplished by a three-roll coating method.

10. The method according to claim 1 additionally comprising the following steps prior to the step of adding one or more highly fluorinated polymers:
    d) degassing or defoaming said preliminary composition; and
    e) further mixing said preliminary composition by ultra high shear mixing.

11. The method according to claim 1 additionally comprising the step of:
    f) subsequent to the step of applying said coating composition, heating said electrically conductive porous substrate to a temperature sufficient to sinter said highly fluorinated polymers.

12. The method according to claim 1 additionally comprising the step of:
    g) coating said electrically conductive porous substrate with a hydrophobizing agent prior to the step of applying said coating composition.

13. The method according to claim 1 wherein said one or more surfactants are amine oxide surfactants.

14. The method according to claim 13 wherein said amine oxide surfactants are alkyl dimethylamine oxides according to formula II:

$$R_3N \rightarrow O \qquad (II)$$

where each R is independently selected from alkyl groups containing 1–20 carbons which may include ether oxygens, which may be substituted with alcohol groups, and which may be additionally substituted.

15. The method according to claim 13 wherein said amine oxide surfactants are alkyl dimethylamine oxides according to formula (I):

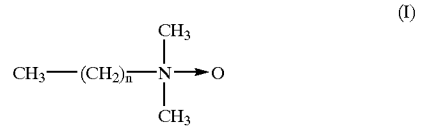

wherein n is 9 to 19.

16. The method according to claim 1 wherein said vehicle comprises water.

17. The method according to claim 1 wherein said one or more highly fluorinated polymers are in an aqueous dispersion.

18. The method according to claim 1 wherein said preliminary composition additionally comprises a thickening agent.

19. A gas diffusion layer for an electrochemical cell made by use of the method of claim 1.

20. A gas diffusion layer for an electrochemical cell made by use of the method of claim 1 demonstrating essentially no carbon bleed-through from a coated side of said electrically conductive porous substrate to an uncoated side of said electrically conductive porous substrate.

* * * * *